INVENTOR
Ronald V. Calabrese
BY
Davis, Lucas, Brewer & Brugman
ATTORNEYS

June 20, 1972   R. V. CALABRESE   3,671,142
LIQUID LEVEL CONTROL
Filed June 22, 1970   3 Sheets-Sheet 3

INVENTOR
Ronald V. Calabrese
BY
Davis, Lucas, Brewer & Brugman
ATTORNEYS

United States Patent Office 3,671,142
Patented June 20, 1972

3,671,142
LIQUID LEVEL CONTROL
Ronald V. Calabrese, Forest Park, Ill., assignor to Lumenite Electronic Company, Franklin Park, Ill.
Filed June 22, 1970, Ser. No. 48,270
Int. Cl. F04b 49/06
U.S. Cl. 417—36
11 Claims

ABSTRACT OF THE DISCLOSURE

Liquid level control or indicator circuit in which a resistance bridge is unbalanced by change of liquid level in a container. Bridge is normally slightly unbalanced, and the degree of this slight unbalance may be variable to change the sensitivity. Change in liquid level significantly unbalances the bridge to bias a controlled rectifier, thereby triggering energization of a pump, valve, or signal or indicator device.

BACKGROUND OF THE INVENTION

The field of the invention is generally that of controlling liquid level in a container by pumping or valving, or signaling, a change in liquid level. When employed as a pump control, the circuit may be covered by Patent Office Classification No. 417.

Where the liquid level in a container has to be controlled between upper and lower limits, as for example in a sump pump handling dirty water, intermittently, and in widely variable quantities, prior attempts to control the level by fixed probes or electrodes in the sump have not been satisfactory. In some such cases, high voltages between the probes have been employed. This can be dangerous to a person handling the wet probes, and unreliable where high voltage shorts through hairline cracks in the insulation may cause spurious pump operation. In other cases, sensitivity has been difficult to maintain and adjust, or the circuits have been overly sensitive when designed to cover a multiplicity of applications and fluids, so that spurious operation has occurred due to high voltage shorts through dirt, lint, and thread touching one or more probes.

SUMMARY OF THE INVENTION

A principal object of the present invention is to provide a control circuit for generating a signal in response to change in level of liquid in a container, and then to use the signal as an indication of level; or to use the signal for controlling a filling- or emptying-pump or -valve, to maintain liquid level between predetermined limits.

Another object is to provide a liquid level control circuit using non-movable probes or electrodes to determine liquid level, the circuit being capable of functioning at a relatively low, safe voltage.

Another object is to provide such a control circuit in which sensitivity is relatively easily adjustable, to operate on: poorly conductive liquid such as clean water; slightly better conductive liquid such as milk; or more conductive liquid such as dirty water handled by sump pumps, and highly conductive, ionic aqueous solutions.

A specific object is to provide a liquid level control circuit having probes extending into a container to determine the upper and lower liquid levels, the circuit having a normally-near-balanced resistance bridge which is significantly unbalanced by change of liquid level relative to the probes for triggering a signal to actuate a level-control pump or valve or a level-indication device.

Other objects and advantages will be apparent from the following description taken in connection with the drawings in which.

Like parts are referred to by like reference characters throughout the figures of the drawings.

Figure 1:
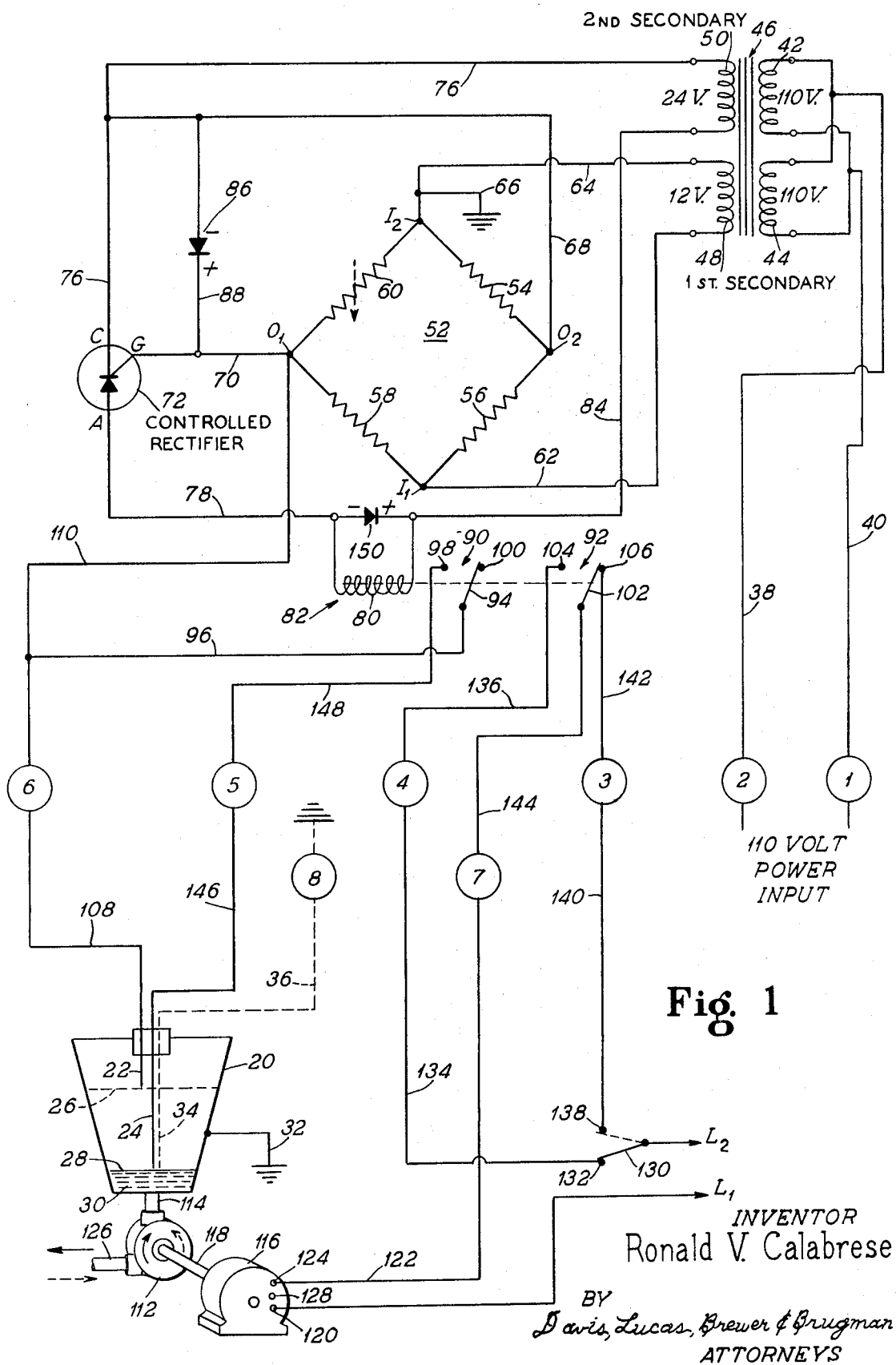
FIG. 1 is a schematic representation of a preferred embodiment of the liquid level control circuit according to the present invention, illustrating its application to controlling the liquid level in a container by a pump, the pump being selectively operable either to empty the container when the level rises to an upper probe, or to fill the container when the level drops to a lower probe.
Figure 2:
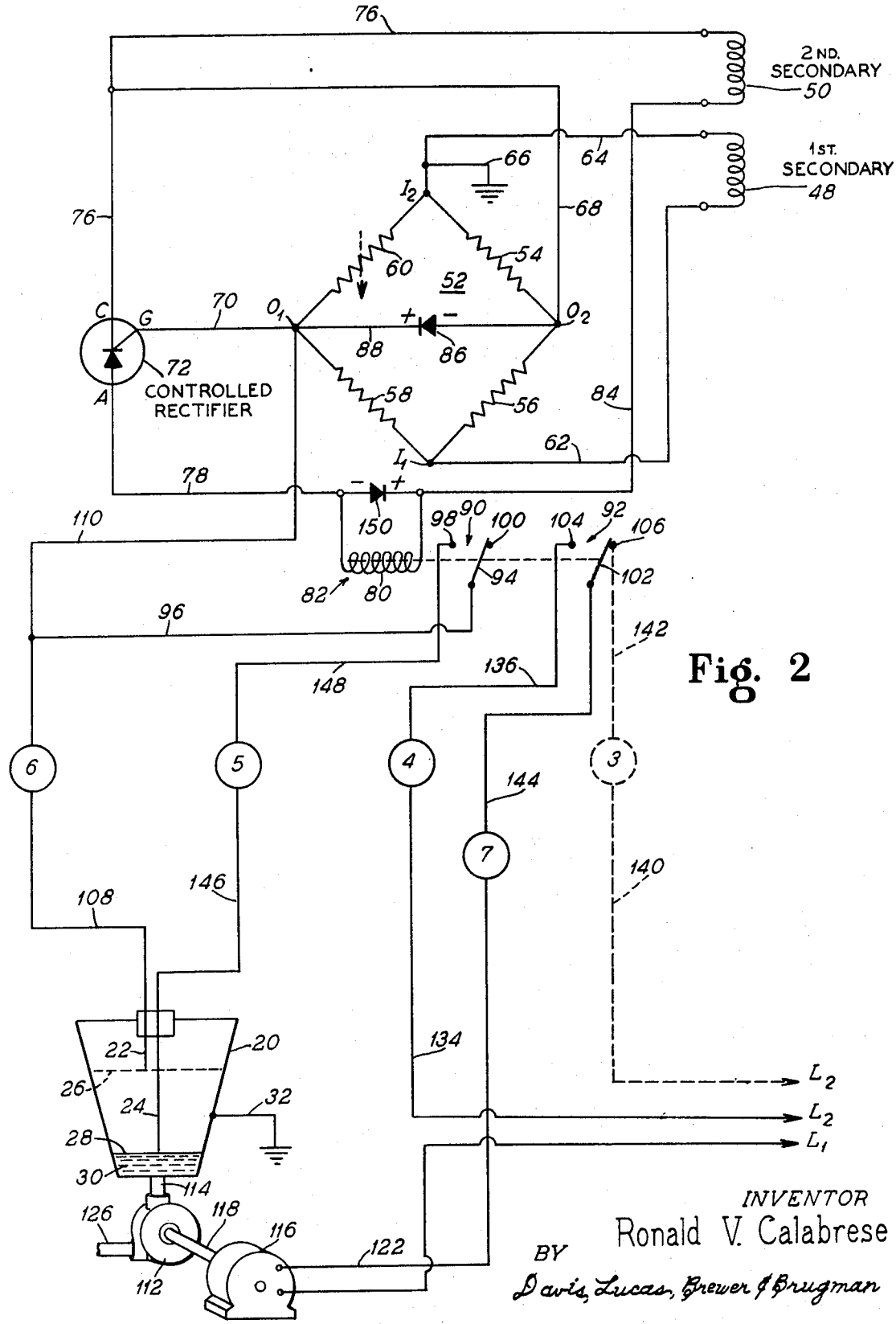
FIG. 2 is a simplified version of FIG. 1.

A typical application of the invention is shown in FIGS. 1 and 2 where, by making appropriate connections to the power source, the level in the container or tank may be regulated by operating a pump either to fill the container or to empty it.

A container or tank 20 is equipped with upper and lower probes 22, 24 establishing upper and lower liquid level limits 26, 28 for an electrically conductive liquid such as water, milk, and other beverages and aqueous solutions. The tank 20 may be connected through line 32 to ground, if the tank wall is metal or other electrically conductive material. If it is glass or other nonconductive material, the liquid may be grounded through probe 34 and conductor 36 to Ground Terminal No. 8.

A power source such as a 110 volt alternating current source, may be connected across Terminals Nos. 1 and 2. Conductors 38 and 40 energize the two primary coils 42, 44 of main power transformer 46.

A first secondary winding 48 provides a 12 volt alternating current; and a second secondary winding 50 provides a 24 volt alternating current source.

An important part of the present invention is the resistance bridge 52. This has four legs containing, respectively, resistors 54, 56, 58 and 60.

The bridge has input terminals $I_1$ and $I_2$ connected by conductors 62 and 64 to the first secondary coil 48. $I_2$ is grounded through conductor 66.

The bridge has output terminals $O_1$ and $O_2$. $O_2$ is connected by conductors 68 and 76 to one side of the second secondary coil 50. $O_1$ is connected by conductor 70 to the gate G of controlled rectifier 72.

For ordinary sump pump operation where the liquid 30 is waste or impure water, the values of the bridge resistors may be as follows:

| Resistor: | Ohms |
|---|---|
| 54 | 1,000 |
| 56 | 1,000 |
| 58 | 2,500 |
| 60 | 5,000 |

This will unbalance the bridge slightly, but not sufficiently to fire the controlled rectifier where, for example, the letter is a GE2N–2322 type, or its equivalent.

A feature of the present invention is that the sensitivity of the circuit can be varied by adjusting the degree of unbalance of the bridge to provide some normal voltage drop across the output terminals $O_1$ and $O_2$, but less than that required to fire the controlled rectifier.

Another degree of unbalance which has been found practicable for use with the above-mentioned controlled rectifier is obtained by providing resistors 58 and 60 with values of 6,000 and 10,000 ohms respectively, the other two resistors being 1,000 ohms each, as above described.

A still further means of providing slight, but controllable unbalance in the bridge, is to make one or more of the resistors variable. For example, the broken-line arrow superimposed on resistor 60, indicates that this may be a variable resistor, if desired.

The controlled rectifier 72 has its cathode C connected by conductor 76 to the second secondary winding 50. Cathode C is also connected to output terminal $O_2$ via conductor 68.

The anode A of the controlled rectifier is connected through a conductor 78 to one side of an operating coil 80 of a relay generally designated 82. The other side of the coil 80 is connected through conductor 84 to the second secondary coil 50.

A biasing rectifier 86 is connected in line 88 between conductors 70 and 68, the latter connected to $O_2$. A more simplified representation of this is shown in FIG. 2 where the biasing rectifier is shown connected between output terminals $O_1$ and $O_2$. It is poled as shown, to place a positive signal on the gate and a negative signal on the cathode. When the output voltage $O_1$–$O_2$ is sufficiently high, as will be described, the voltage differential between the gate and cathode of the controlled rectifier will trigger the latter and cause current to flow in the circuit comprising lines 76, 78, 84, and coils 50 and 80.

The relay 82 includes separate sets of holding contacts 90 and power contacts 92. Holding contacts 90 include a movable armature 94 connected to a conductor 96 and movable between forward contact 98 and back contact 100. Power contacts 92 include a movable armature 102 movable between forward and back contacts 104, 106 respectively.

The upper probe 22 is connected through conductor 108, Terminal No. 6, and conductor 110, to conductor 70. The purpose of this is to unbalance the leg containing bridge resistor 60 when the probe 22 is submerged in the liquid. This, in effect, grounds the output $O_1$, thereby shorting the bridge leg from $I_2$ to $O_1$ through the ground when probe 22 is submerged. This is as follows: $I_2$ is connected directly to ground through conductor 66. $O_1$ is connected to ground through conductors 110 and 108, probe 22, liquid 30, and conductor 32.

Pump 112 is connected by pipe 114 to the bottom of container 20. The pump is driven by motor 116 through a shaft 118. When the motor is connected as shown, to power line $L_1$ through terminal 120, and to power line $L_2$ through terminal 124 and conductor 122, the pump 112 acts as a sump pump and draws liquid from the container 20 through the pipe 126, in the direction of the solid-line arrow. When line 122 is connected to terminal 128, instead, the pump reverses and draws liquid in the direction of the broken arrow and pumps it into the container 20. For sump pump operation, the selector switch 130 is placed in the solid-line condition shown in FIG. 1, the power line $L_2$ being connected through contact 132, conductor 134, Terminal No. 4, and conductor 136 to forward contact 104 of the power contacts 92.

Alternatively, if the pump is connected to pump liquid into the container 20, the selector switch 130 will be placed in the broken-line condition of FIG. 1, connecting power line $L_2$ to contact 138, line 140, Terminal No. 3, and line 142 to back contact 106 of main contact set 92. In this position, the circuit would be completed through armature 102, line 144, Terminal No. 7, line 122 and $L_1$, to energize the motor 116.

Use and operation of the circuit shown in FIGS. 1 and 2, in sump pump service will now be described.

Assume the 110 volt power input is applied across Terminals Nos. 1 and 2. Assume a suitable power source is likewise applied across lines $L_1$, $L_2$; this may or may not be the same power supply as applied across Terminals Nos. 1 and No. 2. As water accumulates in the container 20, it first submerges the lower probe 24. This is connected through line 146, Terminal No. 5, and line 148, to contact 98, which is open, so nothing happens. As the water continues to accumulate, it rises to the level 26, touching the upper probe 22. This shorts the output terminal $O_1$ of the bridge, as above mentioned, through the water and into the ground via conductor 32 (or via conductor 36, if the wall of container 20 is nonconducting). The resulting short circuit from $I_2$ to $O_1$, through ground, bypasses resistor 60, upsetting the near-balance condition of the bridge. This places a substantial voltage differential across output terminal $O_1$–$O_2$ and the biasing rectifier 86 places a positive signal on the gate G and a negative signal on the cathode C. This fires the controlled rectifier 72 rendering the circuit, including the operating coil 80 and the second secondary coil 50, conductive.

A rectifier 150 is shunted across operating coil 80, thereby placing a pulsating D.C. current in that coil in response to the A.C. signal in second secondary coil 50. When the operating coil 80 is so energized, armature 94 is closed against contact 98, and armature 102 is closed against contact 104.

This starts the pump through a circuit from power line $L_1$, through motor 116, armature 102, front contact 104, lines 136 and 134, and condition contact 132, to power $L_2$. Because the pump motor terminals 120, 124 are connected as indicated, it will turn in a direction to operate the pump 112 to draw liquid out of the container 20. This lowers the liquid level. As the level drops below the upper probe 22, the lower probe 24 will still be submerged and; therefore, the ground circuit from conductor 32 (or 36) will remain held through the liquid, and through closed contact 98 to the output terminal $O_1$. This will maintain the triggering bias on the controlled rectifier 72, and will keep operating coil 80 energized and pump motor 116 running.

When the water is pumped out of the container 20 to bring the level below the lower electrode 24, the ground circuit from conductor 32 through the liquid will be broken, and the bridge 52 will be returned to its normal state. Controlled rectifier 72 will cease firing. Operating coil 80 will be de-energized. Contacts 90, 92 will drop out to their "back" conditions shown in FIGS. 1 and 2. This stops the pump until the water in container 20 accumulates to the level 26 when the process will be repeated.

Now consider the operation of the circuit in FIGS. 1 and 2, in which the pump 112 pumps liquid *into* the container 20 when the level drops below the lower electrode 24. (For this condition, liquid 30 will be drawn out of the container 20, by means not shown, and will be replenished as required by the pump 112.)

For this filling operation, the selector switch 130 will be moved to the broken-line position shown in FIG. 1, where the power line $L_2$ is connected to conductor 140. Line 122 is shifted to motor terminal 128, thereby enabling the motor to turn in a direction to pump liquid from pipe 126 through pipe 114 *into* the container 20, as required.

Assume the filling condition mentioned, and assume further, the water has dropped to the lower level 28, just below the lower probe 24. This de-energizes operating coil 80, placing contacts 90, 92 in the position of FIGS. 1 and 2. Motor 116 is then energized, driving the pump 112 to pump liquid *into* the container. When the level submerges the lower probe 24, nothing happens because contact 98 is open. Pump 112 continues to operate. Liquid continues to rise. When it touches upper probe 22, ground conductor 32 (or 36) is shorted through the liquid, and through upper probe 22 and lines 108 and 110, to the output terminal $O_1$ of the bridge. This biases the controlled rectifier 72 to fire as explained above. This energizes operating coil 80, and moves armatures 94, 102 against their respective contacts 98, 104.

This de-energizes the motor 116 and stops pump 112. Subsequently, when liquid level in the container again drops below the lower probe 24, the pumping cycle described above will be repeated.

It should be emphasized that the control circuit of the present invention may be used in circuits other than the pump application shown in FIGS. 1 and 2.

Figure 3:
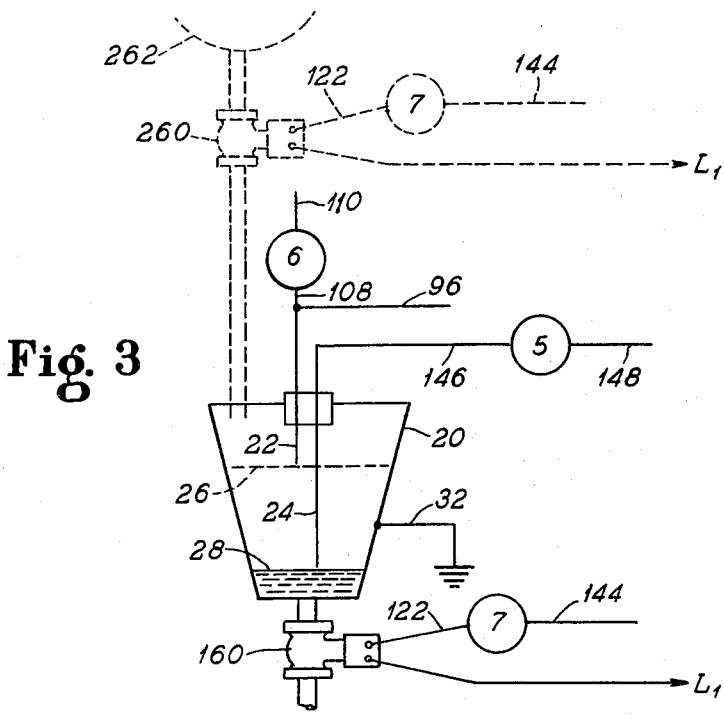
FIG. 3 is a fragmentary view showing a modification of FIG. 2 in which the liquid level is controlled by valves instead of pumps.

FIG. 3 shows a portion of FIG. 2 modified to show how the liquid level in container 20 may be controlled by electrically actuated valves 160 and 260.

Where the container 20 is filled (by a liquid source not shown), emptying-valve 160 and the circuit of the present invention may be used to maintain the liquid between levels 26 and 28. By connecting power line $L_2$ to Terminal No. 4 (FIG. 1), as described above for sump pump operation, the valve 160 will be energized through line $L_1$ and line 122, to open when the liquid reaches upper level 26, and to close when it reaches lower level 28.

By disconnecting line $L_2$ from Terminal No. 4, and connecting it to Terminal No. 3 shown in broken lines in FIG. 2, filling-valve 260 will maintain the liquid between levels 26 and 28.

The circuit of FIG. 3 will function exactly as described above in connection with the pump filling operation. Instead of the pump 112 being actuated to fill the container, filling-valve 260 will open in response to a signal between power lines $L_1$ and $L_2$ through contact 106. The valve 260 will remain open until the liquid reaches level 26 and submerges the upper probe 22. At this time, a short from ground 32, through the liquid and probe 22, to the output terminal $O_1$, will fire the controlled rectifier 72, energizing operating coil 80 and closing contacts 98, 104, as described above in connection with the pump filling operation. This allows the valve 260 to close, shutting off flow of liquid from the reservoir 262 to the container 20, until the liquid drops again to level 28 at which time the entire cycle will be repeated.

Figure 4:
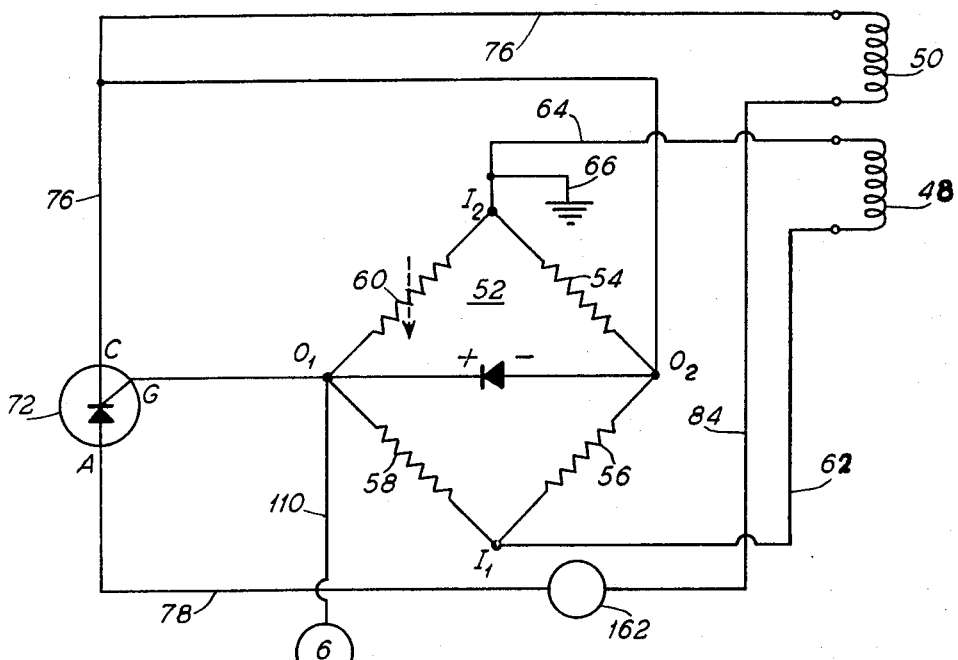
FIG. 4 is a further modification of FIG. 2, showing the basic signal or indicator circuit as it may be used to energize a signal lamp to indicate the presence or absence of liquid at a certain level in a container.

The basic circuit involved in the present invention is shown in FIG. 4, where a signal light 162 is shown in place of the operating coil 80 and its associated rectifier 160. Also, stripping the invention to its essentials, only one probe, 22, is shown.

In the circuit of FIG. 4, there is no direct control function. Instead, the signal circuit, which includes the controlled rectifier, the second secondary winding 50, and the signal light 162, will be energized when the liquid in container 20 rises to the level 26 and submerges the probe 22. If liquid touches probe 22, indicator light 162 will be "on." If it does not, the light will be "off." This is a simple, indicator application of the present invention.

Although the conductors 32 and 66 are interconnected through conventional ground connections, a special ground interconnection in the form of a wire (not shown) may be used.

I claim as my invention:

1. A liquid level control for maintaining the level of a liquid in a container between upper and lower limits, said control comprising:
    an upper probe extending to the upper limit in the container,
    a lower probe extending to the lower limit in the container;
    an alternating electrical current source;
    a pump operating to change the level of liquid in the container;
    a transformer having:
        (a) primary winding means energized by the source,
        (b) a first secondary winding providing a source of bias voltage, and
        (c) a second secondary winding providing a power source;
    a relay having an operating coil, and two sets of switch contacts, one of said sets of contacts operating in response to energization of the operating coil to control the energization of the pump from said electrical source and the other set of contacts operating in response to energization of the coil to electrically connect the probes together to hold the pump in controlled condition;
    a resistance bridge having four legs, each containing a resistor, the bridge having a pair of opposed input terminals connected across the source of bias voltage, and the bridge having opposed first and second output terminals, the resistors being sized to substantially balance the bridge to provide a minimum normal voltage differential across the output terminals in response to a voltage differential across the input terminals;
    a controlled rectifier connected in a closed series circuit with the relay operating coil and the power source, the controlled rectifier including a biasing circuit in which the controlled rectifier gate is connected to a first output terminal of the bridge, the cathode is connected to a second output terminal of the bridge, and the two output terminals are interconnected through a biasing rectifier poled to generate a firing voltage differential between the gate and cathode when a predetermined voltage greater than the said minimum voltage appears across the output terminals in response to significant unbalance of the bridge, one of the bridge input terminals being connected through ground to the liquid in the container;
    the upper probe being connected to said first output terminal whereby grounding of the upper probe through the liquid significantly unbalances the bridge to cause the generation of the firing voltage and consequent energization of the relay coil by current flow through the controlled rectifier from the said power source.

2. A liquid level control according to claim 1 in which the pump is effective when energized to pump liquid into the container and is energized and de-energized through the switch contacts to respectively start the pump at the lower limit and stop the pump at the upper limit.

3. A liquid level control according to claim 2 in which the relay includes sets of holding and power contacts; the holding contacts are open, and the power contacts connect the pump to its electrical source, when the operating coil is non-energized; and the holding contacts connect the upper and lower probes, and the power contacts are open, when the operating coil is energized.

4. A liquid level control according to claim 1 in which the pump is effective when energized to pump liquid from the container and is energized and de-energized through the switch contacts to respectively start the pump at the upper limit and stop the pump at the lower limit.

5. A liquid level control according to claim 4 in which the relay includes sets of holding and power contacts; the holding contacts and power contacts are open, when the operating coil is non-energized; and the holding contacts connect the upper and lower probes, and the power contacts connect the pump to an electrical source, when the operating coil is energized.

6. A liquid level control according to claim 1 in which the biasing rectifier places a significant, positive bias on the gate to trigger the controlled rectifier and energize the operating coil in response to the presence of liquid between the upper and lower limits in the container.

7. A liquid level control according to claim 1 in which the relay is operable responsive to pulsating D.C. current, and the operating coil is shunted by a rectifier.

8. A liquid level control according to claim 1 in which the resistance bridge includes means for varying its degree of balance to adjust the minimum normal voltage differential across the output terminals.

9. A liquid level control according to claim 1 in which one of the bridge resistors is variable to adjust the sensitivity of the control.

10. A liquid level control according to claim 1 in which the said minimum voltage differential across the output terminals is less than the firing voltage of the controlled rectifier.

11. A level control for liquid in a container comprising:
a probe in said container;
first and second alternating current power sources;
a substantially balanced resistance bridge having a pair of opposed input terminals connected to said first alternating current power source, and opposed first and second output terminals normally having an insignificant voltage differential while the bridge remains substantially balanced;
a controlled rectifier connected in a closed series circuit with said second alternating current power source, said controlled rectifier including a biasing circuit in which said bridge output terminals are connected respectively to said controlled rectifier gate and cathode, and said output terminals are interconnected through a rectifier poled to place a positive trigger signal on said gate in response to significant unbalance of said bridge;
one of said bridge input terminals being connected to the interior of said container;
said probe being connected to said output terminal on the gate side of said bridge and effective when submerged in electrically conductive liquid in said container to significantly unbalance said bridge and place a positive trigger signal on said gate to fire said controlled rectifier and energize said closed series circuit; and
means responsive to energization of said closed series circuit to change the liquid level in said container.

References Cited

UNITED STATES PATENTS

| | | | |
|---|---|---|---|
| 3,279,379 | 10/1966 | Klyce | 417—36 |
| 3,540,027 | 10/1970 | Rauth et al. | 417—36 |
| 3,408,941 | 11/1968 | Sorensen | 137—392 X |
| 2,635,225 | 5/1953 | Hadady | 137—392 UX |

FOREIGN PATENTS

| | | | |
|---|---|---|---|
| 915,948 | 1/1963 | Great Britain | 137—392 |

CARLTON R. CROYLE, Primary Examiner

R. J. SHER, Assistant Examiner

U.S. Cl. X.R.

137—392; 340—244 R; 417—44